US006254481B1

(12) United States Patent
Jaffe

(10) Patent No.: US 6,254,481 B1
(45) Date of Patent: Jul. 3, 2001

(54) GAMING MACHINE WITH UNIFIED IMAGE ON MULTIPLE VIDEO DISPLAYS

(75) Inventor: Joel R. Jaffe, Evanston, IL (US)

(73) Assignee: WMS Gaming Inc., Chicago, IL (US)

( * ) Notice: Subject to any disclaimer, the term of this patent is extended or adjusted under 35 U.S.C. 154(b) by 0 days.

(21) Appl. No.: 09/393,497

(22) Filed: Sep. 10, 1999

(51) Int. Cl.[7] .................................................. A63F 9/22
(52) U.S. Cl. ................................... 463/20; 273/143 R
(58) Field of Search ............................. 463/1, 9–11, 16, 463/20, 25, 30, 31, 40, 42; 273/143 R, 292, 293, 138.1, 138.2, 139

(56) References Cited

U.S. PATENT DOCUMENTS

| D. 416,054 | 11/1999 | McGahn et al. ..................... D21/370 |
|---|---|---|
| 3,774,158 | 11/1973 | Clark .................................. 340/172.5 |
| 4,621,814 | 11/1986 | Stepan et al. ..................... 273/138 A |
| 4,712,799 | 12/1987 | Fraley ............................... 273/138 A |
| 4,746,981 | 5/1988 | Nadan et al. ........................ 358/160 |
| 4,760,388 | 7/1988 | Tatsumi et al. ...................... 340/717 |
| 4,800,376 | 1/1989 | Suga et al. .......................... 340/721 |
| 4,866,530 | 9/1989 | Kalua ................................. 358/237 |
| 4,924,318 | 5/1990 | Ho ..................................... 358/250 |
| 5,010,413 | 4/1991 | Bahr ................................... 358/242 |
| 5,396,257 | 3/1995 | Someya et al. ......................... 345/1 |
| 5,467,102 | 11/1995 | Kuno et al. ............................ 345/1 |
| 5,580,055 | * 12/1996 | Adams ............................. 274/143 R |
| 5,788,573 | * 8/1998 | Baerlocher ............................. 463/25 |
| 5,828,410 | 10/1998 | Drapeau ................................ 348/383 |
| 5,882,261 | * 3/1999 | Adams .................................. 463/20 |
| 5,951,397 | 9/1999 | Dickinson ............................. 463/36 |
| 6,047,963 | * 4/2000 | Pierce .................................. 463/20 |

OTHER PUBLICATIONS

U.S. Trademark Electronic Search System for Reel Em In Showing First Use In Commerce May 11, 1995, 3 pages.*
U.S. Trademark Electronic Search System for Reel Em In: Cast for Cash Showing First Use In Commerce Jan. 3, 2000, 3 Pages.*
"Reel 'em In" Description and Screen Shots from WMS Gaming website at WMS gaming dot com slash products slash video slash rei slash index dot html, 3 Pages, Feb. 16, 2001.*
"Cast for Cash" Description, Screenshots and Press Releases from WMS Gaming website at WMS gaming dot com slash products slash video slash C4C slash indexdot html, 11 Pages, Feb. 16, 2001.*

* cited by examiner

Primary Examiner—Mark Sager
(74) Attorney, Agent, or Firm—Jenkens & Gilchrist

(57) ABSTRACT

A gaming machine comprising a first video-type display, a second video-type display and a controller. The second display is positioned adjacent the first display. A controller generates a unified image of a game of chance on the first and second displays. The unified image includes a first portion on the first display and a second portion on the second display.

21 Claims, 6 Drawing Sheets

Fig. 4
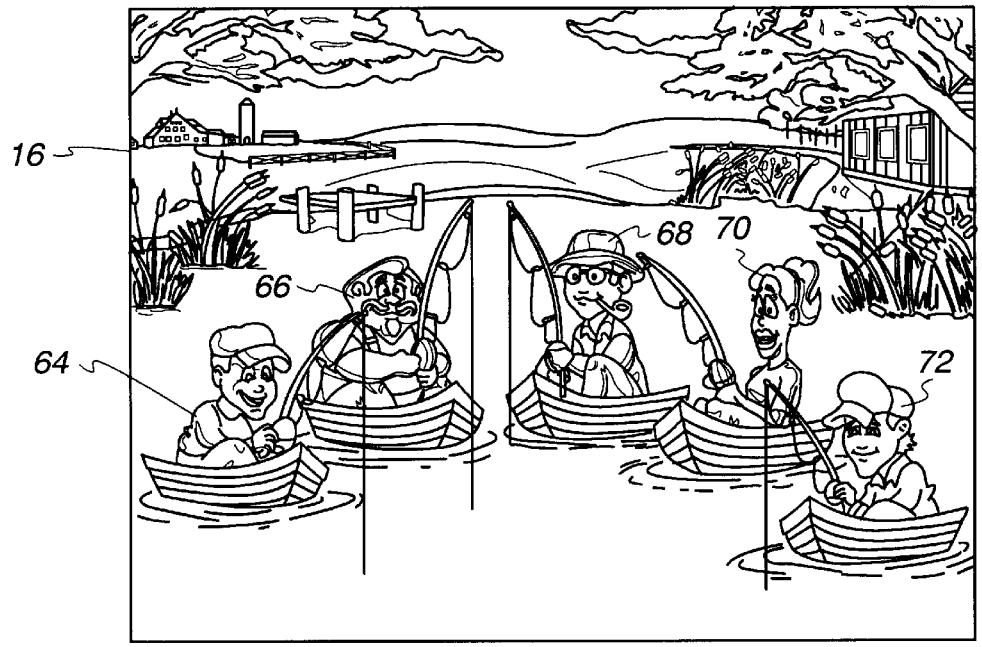
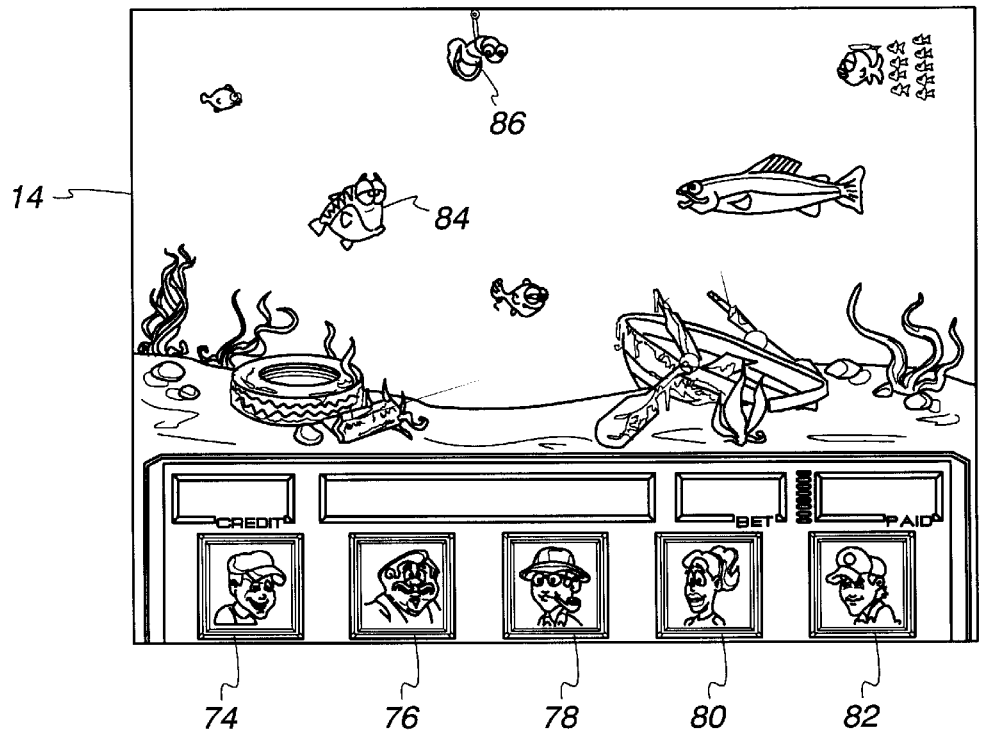
Fig. 5

Fig. 10
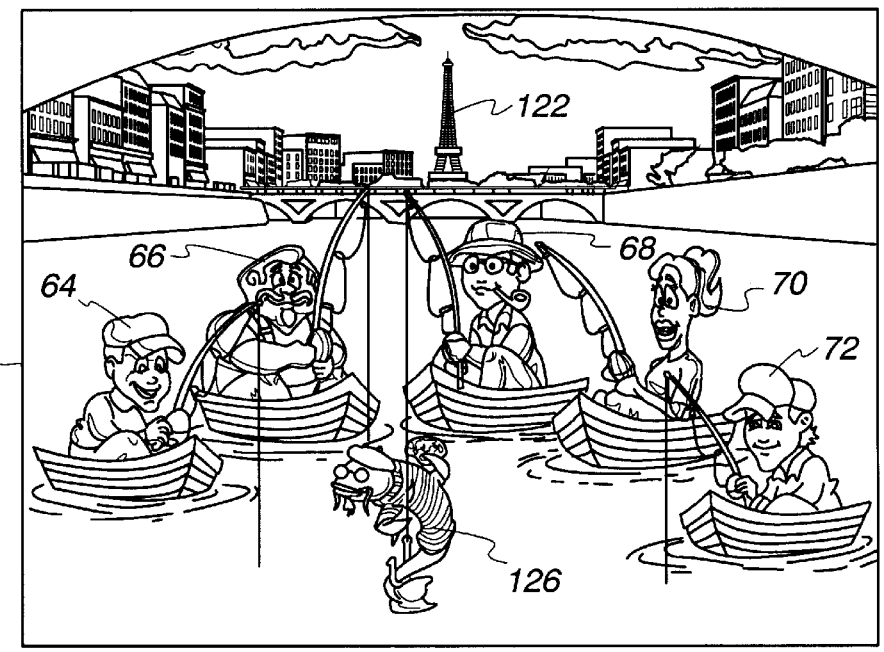
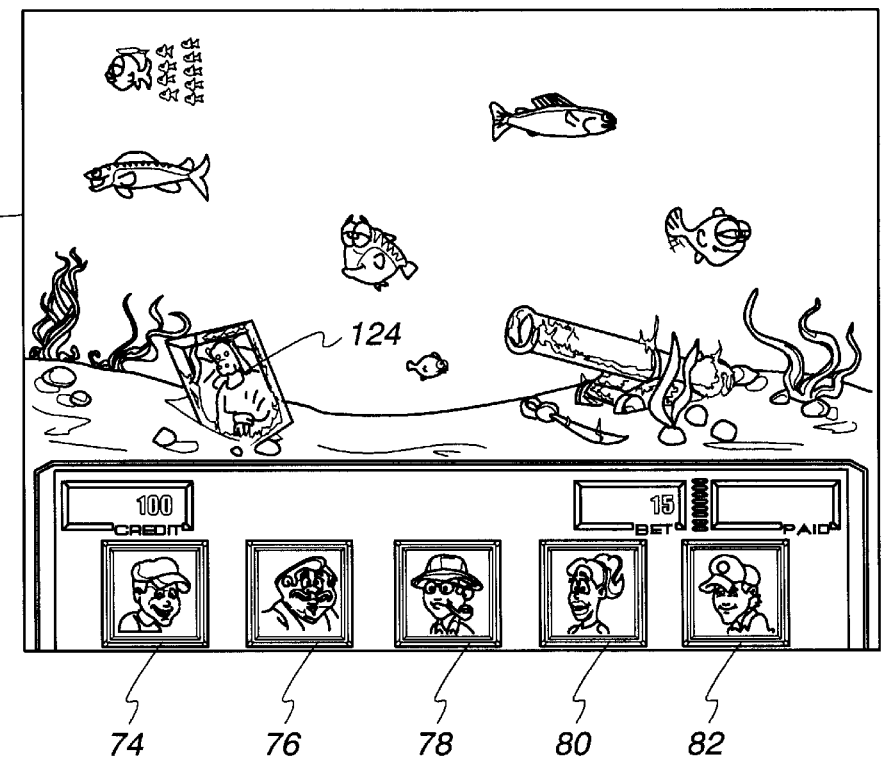
Fig. 11

GAMING MACHINE WITH UNIFIED IMAGE ON MULTIPLE VIDEO DISPLAYS

FIELD OF THE INVENTION

The present invention relates generally to gaming machines and, more particularly, to a gaming machine having a unified image on multiple displays.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

To enhance the entertainment value of a gaming machine, gaming machines often include features such as an enhanced payoff and a "secondary" or "bonus" game which may be played in conjunction with a "basic" game. The bonus game may comprise any type of game, either similar to or completely different from the basic game, which is entered upon the occurrence of a selected event or outcome of the basic game. Generally, the features provide a greater expectation of winning than the basic game.

To attract players, more attractive or unusual video displays and/or audio accompany the basic and bonus games. The fanciful and visually appealing displays offer tremendous advantages in player appeal and excitement relative to other known games. Additionally, such games are attractive to both players and operators. Thus, there is a continuing need to develop new features for the displays and the basic and bonus games to satisfy the demands of players and operators. Preferably, such new features will maintain, or even further enhance, the level of player excitement. The present invention is directed to satisfying these needs.

SUMMARY OF THE INVENTION

In accordance with one aspect of the present invention, there is provided a gaming machine comprising a first video-type display, a second video-type display and a controller. The second display is positioned adjacent the first display. The controller generates a unified image of a game of chance on the first and second displays. The unified image includes a first portion on the first display and a second portion on the second display. The first and second portions of the unified image may interact with each other. The first and second portions of the unified image may show respective first and second actions that appear to be linked to each other. The first action may be a first object on the first display that causes a second object to move in the second action on the second display.

In accordance with another aspect of the present invention, there is provided a gaming machine comprising a basic game controlled by a controller in response to a wager amount. The basic game has a start-bonus outcome that activates a bonus game which causes the controller to shift operation from the basic game to the bonus game. At least two video-type displays show a linked image associated with at least one of the basic and bonus games. A first portion of the image being shown on one of the displays and a second portion of said image being shown on another of the displays. The basic game may include a plurality of symbols on each of a plurality of rotatable reels. The start-bonus outcome may include a predetermined combination of start-bonus symbols on the reels. The linked image may illustrate an action. A first portion of the action being shown on one of said displays and a second portion of the action being shown on another of said displays. The action may be an object moving from being displayed on the one of the displays to being displayed on the other display.

In accordance with a further aspect of the present invention, there is provided a method of operating a gaming machine under control of a controller. The method comprises providing first and second video-type displays, placing a wager amount on a game of chance having a plurality of outcomes and playing the game of chance having a plurality of outcomes. The method further includes providing a unified image associated with the game of chance. A first portion of the image is shown on the first display and a second portion of the image is shown on the second display. The game of chance may include a plurality of symbols on each of a plurality of rotatable reels on one of the displays. The method may further including the step of changing the unified image based on the outcomes. The step of changing the image may include moving an object in the image that was shown on the first display to the second display.

In accordance with yet another aspect of the present invention, there is provided a method of operating a gaming machine under control of a controller. The method comprises providing first and second video-type displays and placing a wager amount on a game of chance having a basic game and a bonus game. The basic game has a start-bonus outcome. The method further includes playing said basic game and providing the bonus game in response to the start-bonus outcome. The bonus game is capable of providing a plurality of bonus payouts. The method further includes providing a unified image associated with the game of chance. A first portion of the image being shown on the first display and a second portion of said image being shown on the second display. The method may further including the step of changing said unified image. The step of changing the image may include moving an object in the image that was shown on the first display to the second display.

BRIEF DESCRIPTION OF THE DRAWINGS

The foregoing and other advantages of the invention will become apparent upon reading the following detailed description and upon reference to the drawings in which:

FIGS. 4 and 5 are display screen captures showing a fishing bonus game on the upper and lower display of the gaming machine;

FIGS. 10 and 11 are display screen captures showing a fishing bonus game on a unified image on a upper and lower display of the gaming machine.

Figure 1:
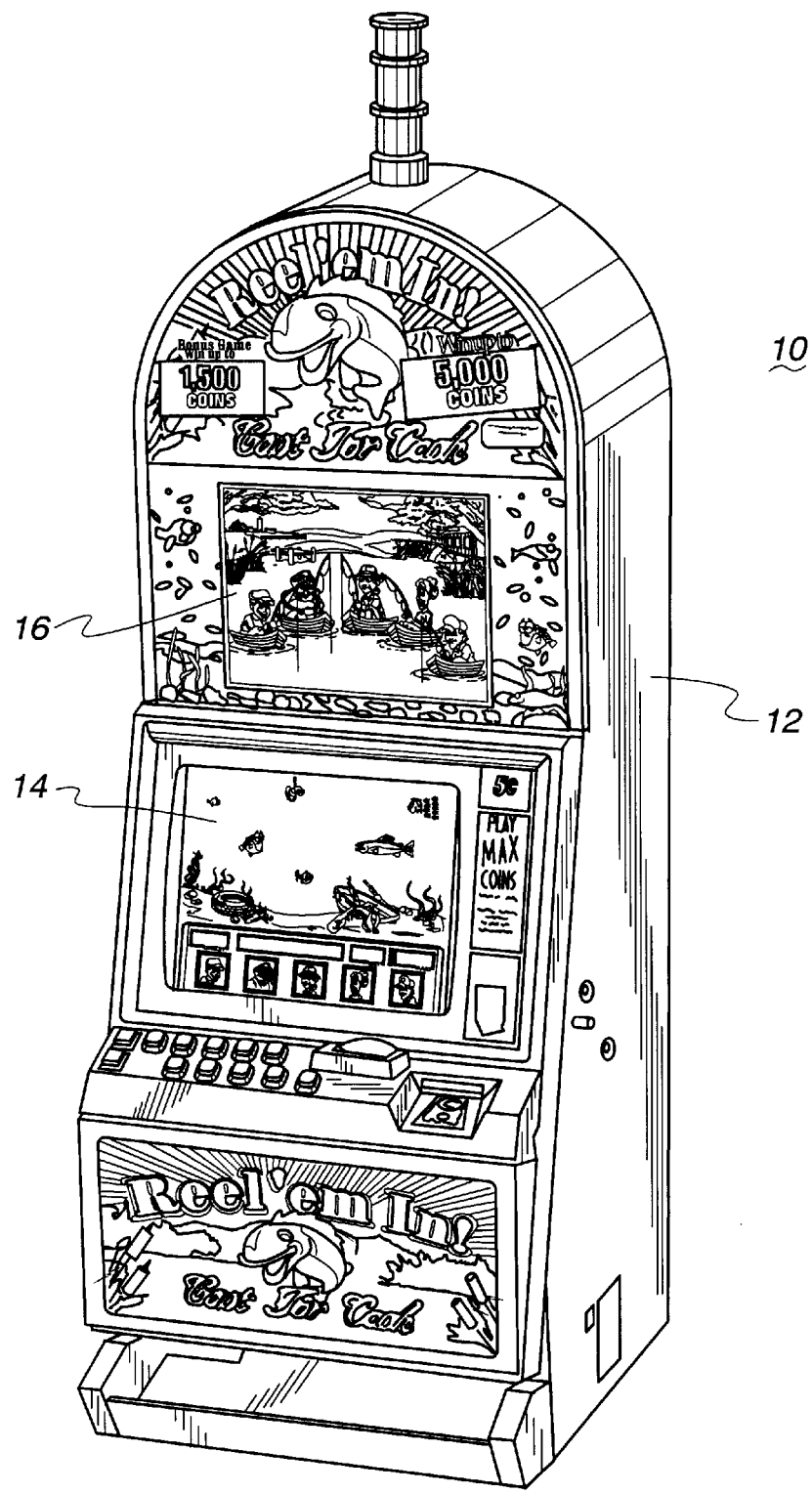
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a video gaming machine 10 that may be used to implement a basic game and a bonus game according to the present invention. The gaming machine 10 includes a large bonnet-top cabinet 12 containing two video displays 14 and 16. The video displays 14 and 16 may comprise a dot matrix, CRT, LED, LCD, electro-luminescent display or generally any type of video displays known in the art. In the illustrated embodiment, the gaming machine 10 is an "upright" version in which the video displays 14 and 16 are oriented vertically relative to the player. The video displays are parallel to each other with their left and right edges aligned. The video displays are positioned adjacent each other separated by a relatively small distance. It will be appreciated, however, that any of several other models of gaming machines are within the scope of the present invention including, for example, side by side video displays being parallel with their top and bottom edges aligned. Additionally, more than two video displays may be used, and the video displays may be separated by varying distances. Furthermore, a "slant-top" version containing two video displays that are slanted at about a thirty-degree angle toward the player may be used.

In one embodiment, the gaming machine 10 is operable to play a game entitled REEL EM IN—CAST FOR CASH™ having a fishing theme. The REEL EM IN—CAST FOR CASH™ game features a basic game in the form of a slot machine with five simulated spinning reels (see FIG. 3) and a bonus game that provides unified fishing images on the two displays. The term "unified image" refers to a single image that is divided into portions that are shown on separate displays. For example, if the unified image is a person, one half of the person may be shown on a first display and the other half of the person may be shown on a second display. Typically, the first and second displays are position adjacent to each other to allow an observer to easily visually join the two halves of the image. Although, the following description describes the REEL EM IN—CAST FOR CASH™ game on the gaming machine 10, it will be appreciated, that the gaming machine 10 may be implemented with different games and/or with any of several alternative game themes.

Figure 2:
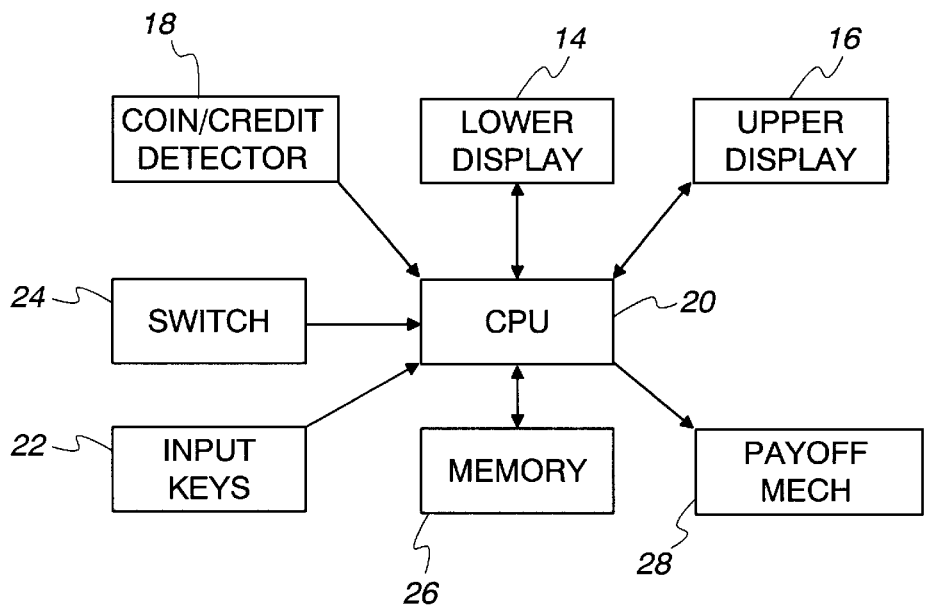
FIG. 2 is a block diagram of a control system suitable for operating the gaming machine in FIG. 1.

FIG. 2 is a block diagram of a control system suitable for operating the gaming machine 10. Coin/credit detector 18 signals a CPU 20 when a player has inserted a number of coins or played a number of credits. Then, the CPU 20 operates to execute a game program which causes the lower video display 14 to display the basic game that includes simulated reels with symbols displayed thereon (see FIG. 3). The player may select the number of paylines to play and the amount to wager via input keys 22. The basic game commences in response to the player activating a switch 24 (e.g., by pulling a lever or pushing a button), causing the CPU 20 to set the reels in motion, randomly select a game outcome and then stop the reels to display symbols corresponding to the pre-selected game outcome. In one embodiment, certain of the basic game outcomes cause the CPU 20 to enter a bonus mode causing the video displays 14 and 16 to show a bonus game. The display screens associated with the REEL EM IN—CAST FOR CASH™ bonus game will be described in detail in relation to FIGS. 4 through 11.

A system memory 26 stores control software, operational instructions and data associated with the gaming machine 10. In one embodiment, the memory 26 comprises a separate read-only memory (ROM) and battery-backed random-access memory (RAM). However, it will be appreciated that the system memory 26 may be implemented on any of several alternative types of memory structures or may be implemented on a single memory structure. A payoff mechanism 28 is operable in response to instructions from the CPU 20 to award a payoff of coins or credits to the player in response to certain winning outcomes which might occur in the basic game or bonus game. The payoff amounts corresponding to certain combinations of symbols in the basic game is predetermined according to a pay table stored in system memory 26. The payoff amounts corresponding to certain outcomes of the bonus game are also stored in system memory 26. Furthermore, the system memory 26 stores data relating to the unified fishing images to be shown on the lower and upper displays 14 and 16.

Figure 3:
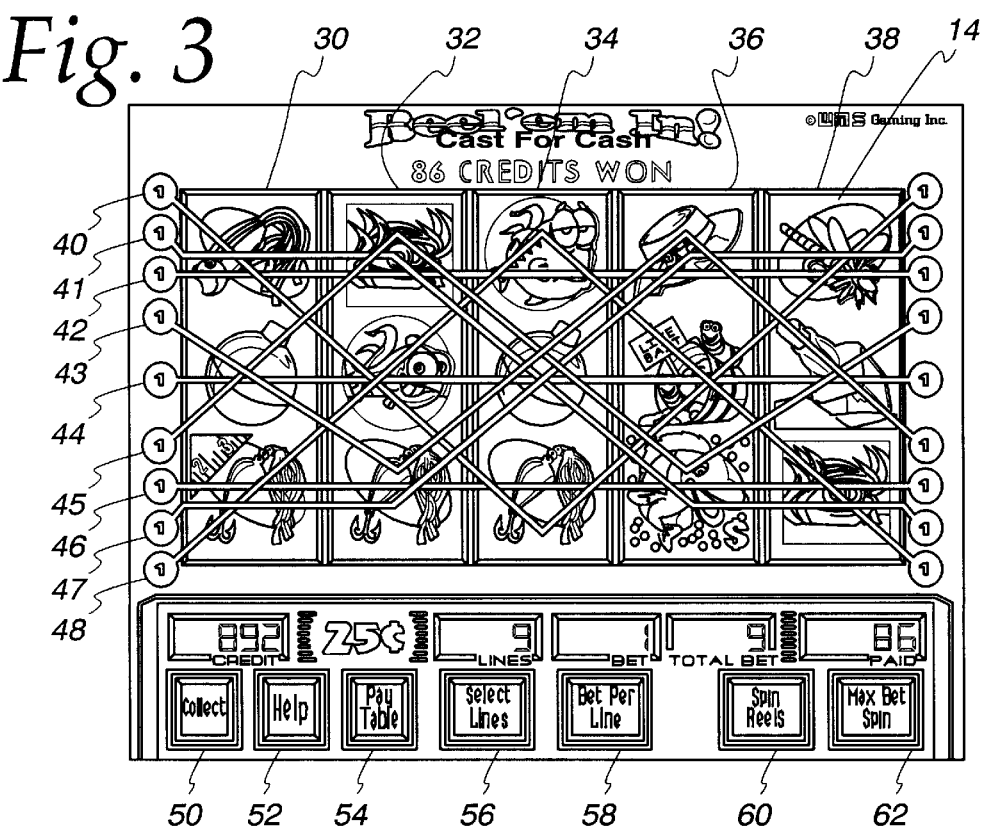
FIG. 3 is a display screen capture showing with a five-reel, nine-line basic game that is played on the gaming machine in FIG. 1.

As shown in FIG. 3, the REEL EM IN—CAST FOR CASH™ basic game is implemented on the lower display 14 on five video simulated spinning reels 30, 32, 34, 36 and 38 (hereinafter "reels") with nine paylines 40–48. Each of the paylines 40–48 extends through one symbol on each of the five reels 30, 32, 34, 36 and 38. Generally, game play is initiated by inserting a number of coins or playing a number of credits, causing the CPU 20 (FIG. 2) to activate a number of paylines corresponding to the number of coins or credits played. In one embodiment, the player selects the number of paylines (between one and nine) to play by pressing a "Select Lines" key 56. The player then chooses the number of coins or credits to bet on the selected paylines by pressing the "Bet Per Line" key 58.

After activation of the paylines, the reels 30, 32, 34, 36 and 38 may be set in motion by touching the "Spin Reels" key 60 or, if the player wishes to bet the maximum amount per line, by using the "Max Bet Spin" key 62. Alternatively, other mechanisms such as, for example, a lever or push button may be used to set the reels in motion. The CPU 20 uses a random number generator (not shown) to select a game outcome (e.g., "basic" game outcome) corresponding to a particular set of reel "stop positions." The CPU 20 then causes each of the video reels 30, 32, 34, 36 and 38 to stop at the appropriate stop position.

Video symbols are displayed on the reels 30, 32, 34, 36 and 38 to graphically illustrate the reel stop positions and indicate whether the stop positions of the reels represent a winning game outcome. Winning basic game outcomes (e.g., symbol combinations resulting in payment of coins or credits) are identifiable to the player by a pay table. In one embodiment, the pay table is affixed to the machine 10 and/or displayed by the lower display 14 in response to a command by the player e.g., by pressing the "Pay Table" button 54. A winning basic game outcome occurs when the symbols appearing on the reels 30, 32, 34, 36 and 38 along an active payline correspond to one of the winning combinations on the pay table. If the displayed symbols stop in a winning combination, the game credits the player an amount corresponding to the award in the pay table for that combination multiplied by the amount of credits bet on the winning payline. The player may collect the amount of accumulated credits by pressing the "Collect" button 50.

Table 1 depicts the pay table for the REEL EM IN—CAST FOR CASH™ basic game. The pay table lists the winning combinations and their associated payoff amounts. From the pay table it can be seen that the REEL EM IN—CAST FOR CASH™ basic game includes the following reel symbols that can lead to a payoff in the basic game: BIG FISH, MEDIUM FISH, SMALL FISH, CLAM, BOTTLE, BAIT, HAT, BOBBER, SPOON LURE, HULA LURE and FLY LURE. The winning combinations pay left to right on the reels. For example, the winning combination of three HAT symbols that pays 5 credits must appear on reels 30, 32 and 34. However, four symbol winning combinations pay both left to right and right to left on the reels. For example, the winning combination of four HAT symbols that pays 30 credits may appear on reels 30, 32, 34, 36 or reels 32, 34, 36 and 38.

TABLE 1

| WIN COMBINATIONS | | | | | PAY |
|---|---|---|---|---|---|
| Big Fish | Big Fish | Big Fish | Big Fish | Big Fish | 10000 |
| Big Fish | Big Fish | Big Fish | Big Fish | | 500 |
| Big Fish | Big Fish | Big Fish | | | 100 |
| Big Fish | Big Fish | | | | 20 |
| Big Fish | | | | | 2 |
| Med Fish | Med Fish | Med Fish | Med Fish | Med Fish | 10000 |
| Med Fish | Med Fish | Med Fish | Med Fish | | 150 |
| Med Fish | Med Fish | Med Fish | | | 30 |
| Med Fish | Med Fish | | | | 10 |
| Med Fish | | | | | 2 |
| Small Fish | Small Fish | Small Fish | Small Fish | Small Fish | 500 |
| Small Fish | Small Fish | Small Fish | Small Fish | | 100 |
| Small Fish | Small Fish | Small Fish | | | 25 |
| Small Fish | Small Fish | | | | 5 |
| Small Fish | | | | | 1 |
| Clam | Clam | Clam | Clam | Clam | 400 |
| Clam | Clam | Clam | Clam | | 80 |
| Clam | Clam | Clam | | | 20 |
| Bottle | Bottle | Bottle | Bottle | Bottle | 300 |
| Bottle | Bottle | Bottle | Bottle | | 60 |
| Bottle | Bottle | Bottle | | | 15 |
| Bait | Bait | Bait | Bait | Bait | 250 |
| Bait | Bait | Bait | Bait | | 50 |
| Bait | Bait | Bait | | | 10 |
| Hat | Hat | Hat | Hat | Hat | 150 |
| Hat | Hat | Hat | Hat | | 30 |
| Hat | Hat | Hat | | | 5 |
| Bobber | Bobber | Bobber | Bobber | Bobber | 100 |
| Bobber | Bobber | Bobber | Bobber | | 20 |
| Bobber | Bobber | Bobber | | | 5 |
| Spoon | Spoon | Spoon | Spoon | Spoon | 100 |
| Spoon | Spoon | Spoon | Spoon | | 10 |
| Hula | Hula | Hula | Hula | Hula | 100 |
| Hula | Hula | Hula | Hula | | 10 |
| Fly | Fly | Fly | Fly | Fly | 100 |
| Fly | Fly | Fly | Fly | | 10 |

Included among the plurality of basic game outcomes are a plurality of different start-bonus outcomes for starting play of a bonus game. A start-bonus outcome may be defined in any number of ways. For example, a start-bonus outcome occurs when a special start-bonus symbol or a special combination of symbols appears on one or more of the reels 30, 32, 34, 36 and 38 in any predetermined display position. The appearance of a start-bonus outcome causes the processor to shift operation from the basic game to a bonus game.

The REEL EM IN—CAST FOR CASH™ bonus game is triggered by lining up three or more identical LURE symbols on adjacent reels on an active payline. In other words, the start-bonus outcomes are the following combinations of start-bonus symbols appearing consecutively on an active payline: (1) SPOON LURE, SPOON LURE, SPOON LURE; (2) HULA LURE, HULA LURE, HULA LURE, and (3) FLY LURE, FLY LURE, FLY LURE. In the illustrated embodiment of FIG. 3, three SPOON LURE symbols appear on payline 45. This symbol combination does not generate a winning basic game outcome; however, these symbols do provide start-bonus outcomes for triggering the REEL EM IN—CAST FOR CASH™ bonus game.

In response to starting the REEL EM IN—CAST FOR CASH™ bonus game, the lower and upper displays 14 and 16 work together to present unified fishing images for the bonus game. The upper video display 16 shows the bonus screen image illustrated in FIG. 4 comprising a group of fishermen on a lake, and the lower video display 14 shows the bonus screen image illustrated in FIG. 5 comprising an underwater view of the lake. The unified fishing image is an above and below water view of fishing. Normally, the upper video display 16 shows the activities of fishermen above the water, and the lower video display 14 shows the activities of fish below the water. FIG. 1 shows how the two portions of the fishing image on the upper and lower displays 16 and 14, namely above and below the waterline, interact with each other and form the unified fishing image when viewed by the player.

The REEL EM IN—CAST FOR CASH™ bonus game commences with the bonus screen of FIG. 4 on the upper video display 16 and the bonus screen of FIG. 5 on the lower video display 14. The initial upper bonus screen of FIG. 4 shows five fishermen characters 64, 66, 68, 70, 72 each within their own boat on a lake. The CPU 20 randomly selects the fisherman characters to display from a cast of possible characters stored in the memory 26. The player starts the bonus game by selecting one of the illustrated fishermen 64, 66, 68, 70, 72. In the illustrated embodiment, the player touches a mechanical button or fisherman icon 74, 76, 78, 80, 82 corresponding to the fishermen 64, 66, 68, 70, 72, respectively, to begin the fishing bonus. For the illustrated example, the player selects the button 76 corresponding to the portly fisherman character 66.

Once the player has selected the fisherman 66, the CPU 20 presents the unified fishing images on the lower and upper displays 14 and 16. The lower and upper displays 14 and 16 work together to provide the unified images of the fishing scene such that an action on the upper display 16 is linked with an action on the lower display 14. As illustrated in FIG. 4, the upper display 16 shows the fishermen 64, 66, 68, 70, 72 in boats with their fishing lines extending into the water. As depicted in FIG. 5, the lower display 14 shows various fish 84 swimming in and out of the underwater scene. During the fishing presentation, bait 86, such as the displayed hook with a worm, or in other embodiments a lure, is lowered down beneath the selected fisherman 66 in the upper display 16.

For the fishing action, some of the displayed fish immediately dart for the bait 86 and other fish swim onto the display 14. Bubbles (not shown) appear around the bait 86 to hide the fish near the bait 86. The CPU 20 uses a random number generator (not shown) to select a bonus game outcome, namely the fish that the selected fisherman 66 will reel out of the water. On the lower display 14, a fury of bubbles appears below water while the fisherman 66 reels in the fish 84. While the fisherman 66 reels in the fish, the upper display 16 shows a splash that increases in size according to the size of the fish 84 on the line. The fury of bubbles on the lower display 14 and the splash on the upper display 16 is one example of the linked action on the displays 14 and 16. Table 2 shows the final splash size for the selected fish 84. When the fish 84 is being reeled from the water, the fisherman characters 64, 68, 70, 72 look toward the fisherman 66 reeling in the fish and comment about the presence of the fish. Although the bubbles on the lower display 14 and splash on the upper display 16 are not shown in FIGS. 4 and 5, an example of the splash or ripple on the upper display 16 is shown in FIG. 6 and an example of corresponding bubbles on the lower display 14 is shown in FIG. 7.

TABLE 2

| Final Splash size | Fish Type | Multiplier Value (times total bet) |
| --- | --- | --- |
| Small | Boot with Frog | 4 |
| Small | Clam | 7 |
| Small | Minnow | 10 |
| Small | Perch | 12 |
| Medium | Catfish | 15 |
| Medium | Pike | 20 |
| Medium | Bottle | Contest or Vacation |
| Large | Pike | 25 or 30 |
| Large | Huge | 35 or 40 |
| Large | Ol' Chester | 150 to 500 |
| Large | Bottle | Contest or Vacation |

Figure 6:
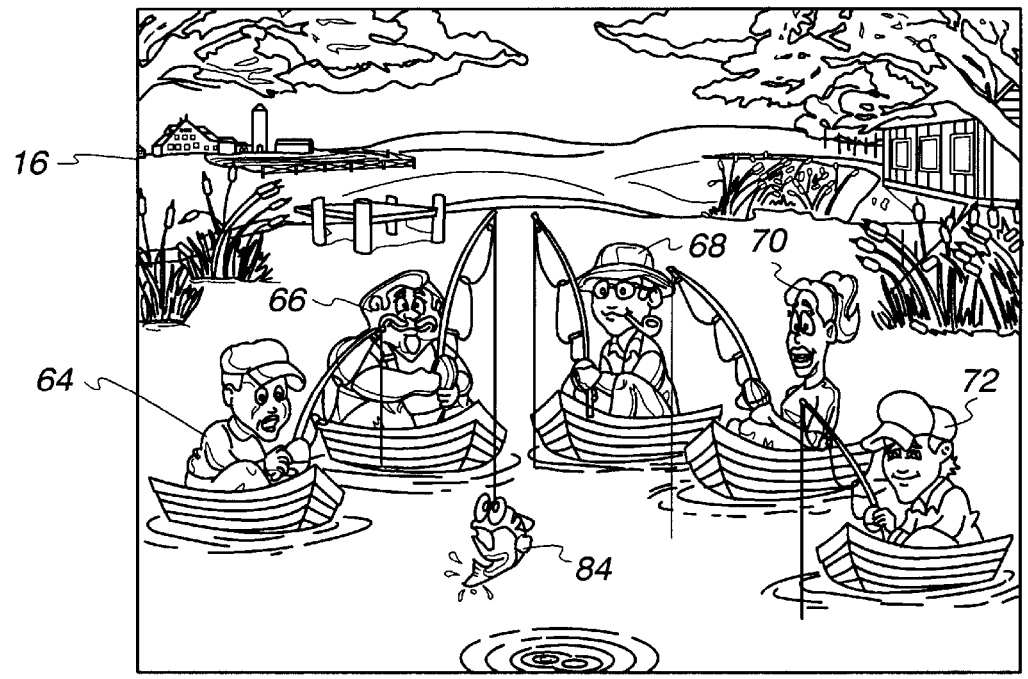
FIG. 6 is a display screen capture showing a fishing bonus game on the upper display of the gaming machine.
Figure 7:
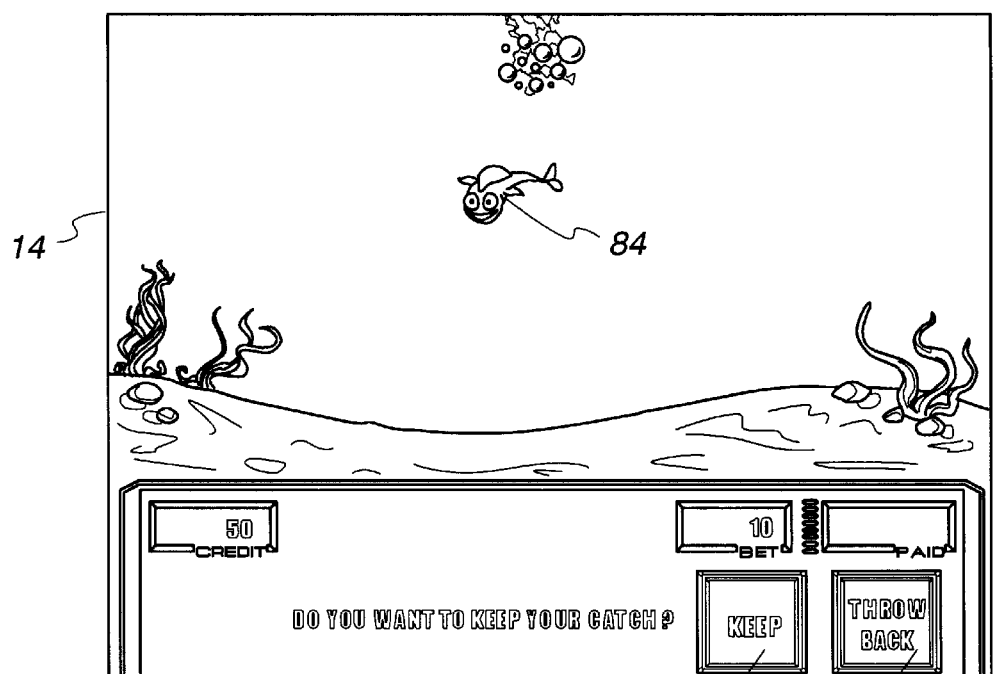
FIG. 7 is a display screen capture showing a fishing bonus game on the lower display of the gaming machine.

The fisherman 66 then pulls the fish 84 out of the water as depicted in FIG. 6. When the fisherman 66 pulls the fish 84 out of the water, the fish still in the water on the lower display 14 look up to the upper display 16 with a concerned look on their faces. The fish 84 has a bonus value to be awarded to the player. In one embodiment, the fish is a multiplier value that is applied to the player's total bet. Table 2 lists the types of fish and their corresponding multiplier values. The fish pay between 4 and 500 times the player's total bet. In other embodiments, the fish may provide monetary awards, free spins, or other appropriate awards. Once the fish 84 is pulled out of the water, the multiplier value is shown on or near the fish 84 on the upper display 16, and the remaining fish underwater smile on the lower display 14. After the player is awarded the multiplier with an award of coins or credit, the CPU 20 returns to the basic reel game.

In one embodiment of the REEL EM IN—CAST FOR CASH™ bonus game, if the selected fisherman 66 catches the Clam or Minnow, sometimes, a Pike, Trout or Huge fish will jump out of the water and eat the smaller fish. In this case, the player receives the multiplier value for the big fish. This feature will occur when the CPU randomly selects a Pike, Trout or Huge fish. Rather than show the large fish being reeled up, a Clam, or Minnow is first reeled in. Then, the big fish that was selected jumps out of the water and eats the smaller fish. This feature occurs one out of six times the CPU 20 randomly selects a Pike, Trout or Huge fish. The Clam and Minnow have an equal chance of being eaten. The lower and upper displays 14 and 16 present the action of the small fish being eaten by the big fish. The upper display 16 shows the Clam or Minnow on the line of the selected fisherman. The lower display 14 shows a large fish moving towards the surface of the water. The large fish moves from the lower display 14 into the upper display 16 and eats the small fish.

One embodiment of the REEL EM IN—CAST FOR CASH™ bonus game includes a "Throwback" feature. The "Throwback" feature provides the player with an option to sacrifice their first multiplier value awarded during the bonus game in attempt to receive a larger multiplier value. The "Throwback" feature is triggered when a ruler appears in the corner of one or more of the lure symbols that trigger the bonus game. The lower symbol on reel 30 in FIG. 3 illustrates the ruler in the corner of the SPOON LURE.

During the "Throwback" feature of the REEL EM IN—CAST FOR CASH™ bonus game, the bonus game operates as described above until the fisherman 66 reels in the fish 84. Once the fisherman 66 has pulled the fish 84 out of the water as depicted in FIG. 6, the player is asked "Do you want to keep your catch?" as shown in FIG. 7. To respond to this inquiry, the player selects either a "Throwback" button 88 or and a "Keep" button 90 that appear on the bottom of the lake in the lower display 14. The bottle and Ol' Chester fish cannot be thrown back. In the upper display 16, the fish 84 looks at the fisherman 66 until a decision is made.

If the player selects the "Keep Fish" button 88, the CPU pays that award and returns to the basic reel game. If the player decides to throw the fish back, the lower and upper displays 14 and 16 show the action of the fish 84 moving from out of the water on the upper display 16 to under the water on the lower display. As illustrated in FIG. 7, the fish 84 forms a happy smile when returned to the water. After the fish 84 returns to the water, the fishing resumes as described above in conjunction with FIGS. 4 and 5. The CPU 20 randomly selects another fish, and the selected fisherman 66 reels in a second fish. The player must keep the second fish, so the CPU 20 awards the player the multiplier value of the second fish.

The REEL EM IN—CAST FOR CASH™ bonus game further provides additional bonus features having the opportunity for even larger bonus awards. If the selected fisherman reels in the bottle, a message in the bottle indicates whether the player will enter a fishing contest or take a fishing vacation. The CPU 20 randomly selects either the fishing contest or the vacation bonus feature for the bottle.

Figure 8:
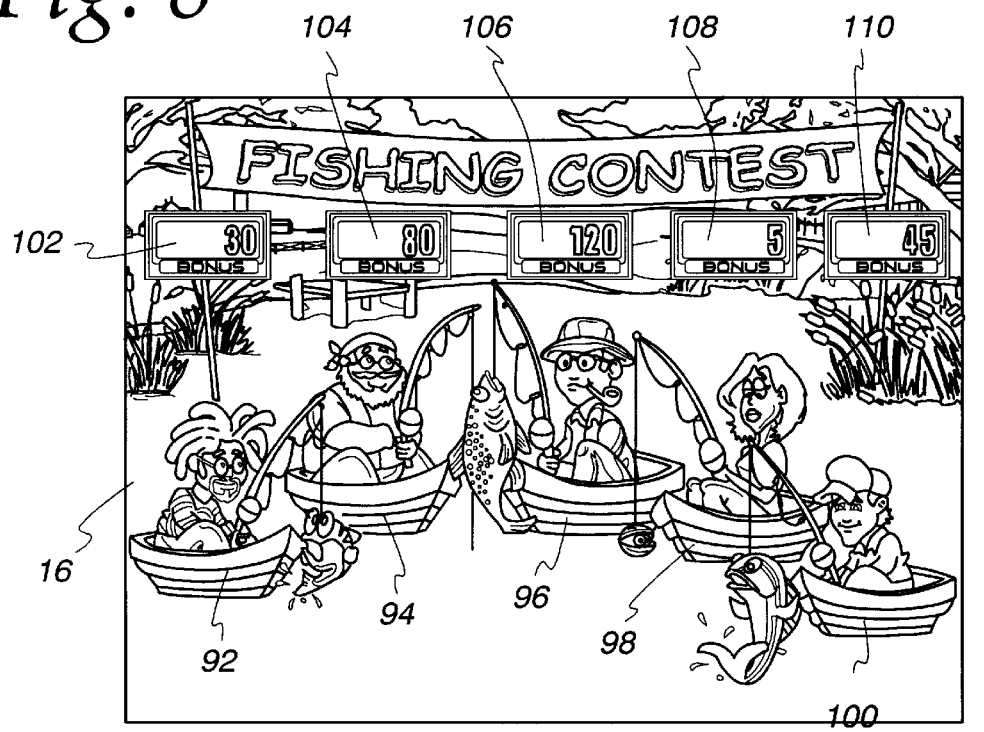
FIG. 8 is a display screen capture showing a fishing bonus game on the upper display of the gaming machine.

If the fishing contest is awarded, the CPU 20 provides unified images of a fishing contest on the lower and upper video displays 14 and 16. During the fishing contest, the fishermen compete against each other to catch the most and largest fish during a period of time. FIG. 8 illustrates the fishing contest as shown on the upper display 16. The fisherman 92, 94, 96, 98, 100 have separate meters 102, 104, 106, 108, 110, respectively, positioned above them. A clock represented by a light meter comprising a horizontal line of blocks that illuminate in sequence to represent passing time (not shown) appears on the lower display 14 to show the time remaining in the contest.

In the contest, the originally selected fisherman represents the player. The upper display 16 indicates the player's fisherman by coloring the meter border of the selected fisherman 94 and graying out all the rest of the meters. The contest starts with the first block of the light meter illuminating. As shown in FIG. 8, the upper display 16 shows the fisherman 92, 94, 96, 98, 100 reeling in fish. The meters 102, 104, 106, 108, 110 show a running sum of the value of the fish reeled in. Table 2 above shows the value of the fish. During the fishing contest, the lower display 14 shows blurry darting fish swimming from the side of the water to the surface of the water. In addition a large amount of bubbles animates near the surface of the water before these fish move onto the upper display 16. The fishing contest varies the time to reel in a fish; some fish take very little time to reel in while other fish are reeled in at a normal rate. No glass bottles or legendary fish are reeled in during the contest.

The fishing contest ends when all of the blocks of the light meter are lit. The player receives bonus credits for all the fish that his selected fisherman 94 reels in during the contest. An additional bonus is awarded for coming in first, second, or third, fourth, or fifth place in the contest according to Table 3. After the player has been awarded his credits, the CPU 20 returns to the basic reel game.

TABLE 3

Fishing Contest Bonus

| | |
|---|---|
| First Place | 40 + total fish caught |
| Second Place | 25 + total fish caught |
| Third Place | 10 + total fish caught |
| Fourth Place | 5 + total fish caught |
| Fifth Place | 2 + total fish caught |

Figure 9:
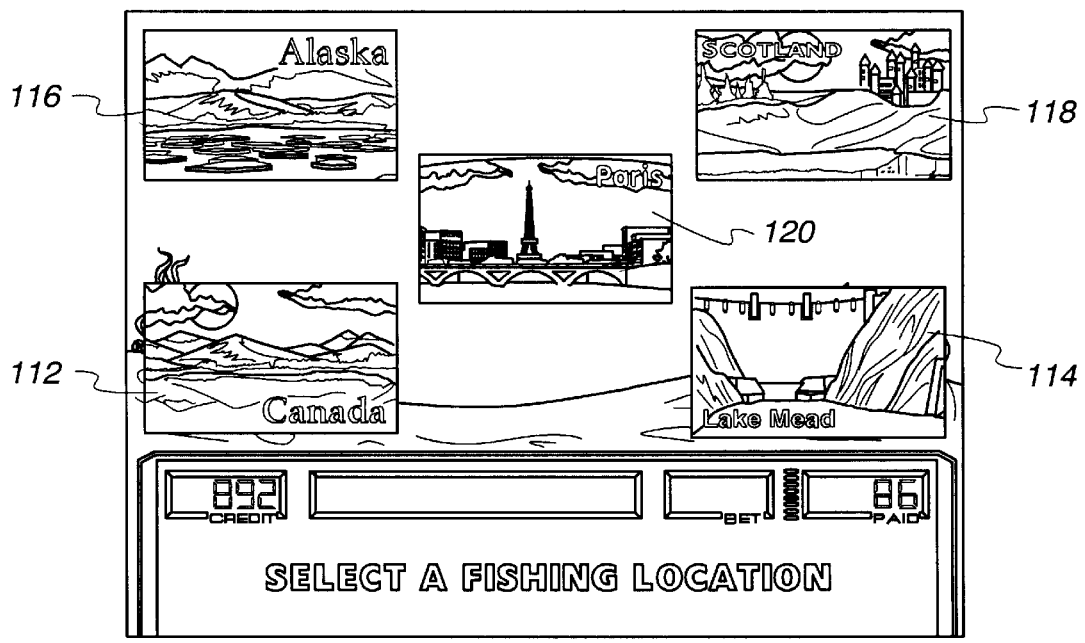
FIG. 9 is a display screen capture showing a fishing bonus game on the lower display of the gaming machine.

If the player wins a fishing vacation, the CPU 20 asks the player to choose the vacation from a menu of destinations. FIG. 9 illustrates the lower display 14 with postcards representing the vacation destinations of Canada 112, Lake Mead 114, Alaska 116, Loch Ness 118, and Paris 120. The player touches one of the postcards on the lower display 14 to select the desired fishing location.

When the player selects the vacation destination, the CPU 20 presents new unified fishing images with the respective lower and upper portions on the lower and upper displays 14 and 16. Each destination has its own characterized lake and fish themed according to the vacation setting. FIGS. 10 and 11 illustrated one unified image of the fishing presentation for the Paris lake with FIG. 10 being the above water portion and FIG. 11 being the below water portion. As illustrated in FIG. 10, the upper display 16 shows the same five fishermen characters 64, 66, 68, 70, 72 from the initial lake shown in FIG. 4. The upper display 16 also shows landmarks that identify the Paris location such as the Eiffel Tower 122. FIG. 11 illustrates the underwater scene for the Paris location with a couple of artifacts on the bottom, such as the Mona Lisa 124.

The vacation fishing presentation proceeds similar to the original fishing presentation described above with FIGS. 4 and 5. To begin the vacation fishing, the player touches one of the mechanical button 74, 76, 78, 80, 82 with the respective fisherman characters 64, 66, 68, 70, 72. For the illustrated example in FIG. 10, the selected fisherman 68 reels in a fish 126 in similar fashion to the original lake. The fish 126 has a costume of a beret to signify the Paris location. The fish reeled in during the vacation bonus have larger values than the original lake. The vacation lake fish have multiplier values ranging from 40 to 2000 times the total bet. Table 4 lists the fish and multiplier values for the vacation lakes. The CPU 20 randomly selects a fish and multiplier value from Table 4 to award the player. After the player receives the award for the fish, the CPU 20 returns to the basic reel game.

TABLE 4

| Fish Type | Multiplier Value (times total bet) |
|---|---|
| Huge 1 | 40 |
| Huge 2 | 50 |
| Huge 3 | 70 |
| Character 1 | 100 |
| Legend | 200 |
| Legend | 300 |
| Legend | 400 |
| Legend | 600 |
| Legend | 800 |
| Legend | 1000 |
| Legend | 2000 |

While the present invention has been described with reference to one or more particular embodiments, those skilled in the art will recognize that many changes may be made thereto without departing from the spirit and scope of the present invention. For example, the basic game need not comprise a spinning reel slot machine game as illustrated in FIG. 1, but may comprise virtually any type of game of chance or skill or combination of games having outcomes and presentations with unified images on the video displays 14 and 16. For example, the basic game may comprise a video poker or video blackjack game. Additionally, more than two displays 14 and 16 may be used to present the unified images. Each of these embodiments and obvious variations thereof is contemplated as falling within the spirit and scope of the claimed invention, which is set forth in the following claims.

What is claimed is:

1. A gaming machine comprising:

a first video-type display;

a second video-type display positioned adjacent said first display; and a controller for generating a unified image of a game of chance on said first and second displays, said unified image including a first portion on said first display and a second portion on said second display wherein said first and second portions of said unified image showing respective first and second actions that appear to be linked to each other and wherein said first action is a first object on said first display causing a second object to move in said second action on said display.

2. The gaming machine of claim 1 further including a third video-type display positioned adjacent said first and second displays, said controller generating a third portion of said unified image on said third display.

3. The gaming machine of claim 1 wherein said second display is positioned below and parallel to said first display, said first portion being an upper portion of said unified image, said second portion being a lower portion of said unified image.

4. The game machine of claim 1 wherein said second display is positioned aside and parallel to said first display, said first portion being a left portion of said unified image, said second portion being a right portion of said unified image.

5. The gaming machine of claim 1 wherein said first and second portions of said unified image interacting with each other.

6. The gaming machine of claim 1 wherein said game of chance includes a basic game and a bonus game, said basic game being controlled by said controller in response to a wager amount, said basic game having a start-bonus outcome, said bonus game being activated by said start-bonus outcome which causes said controller to shift operation from said basic game to said bonus game.

7. The gaming machine of claim 6 herein said controller generates unified image on said first and second displays during said operation of said bonus game.

8. The gaming machine of claim 6 wherein said basic game includes a plurality of symbols on each of a plurality of rotatable reels on one of said displays.

9. A gaming machine comprising:

a basic game controlled by a controller in response to a wager amount, said basic game having a start-bonus outcomes;

a bonus game activated by said start-bonus outcome which causes said controller to shift operation from said basic game to said bonus game; and at least two video-type displays for showing a linked image associated with at least one of said basic and bonus games, a first portion of said image being shown on one of said displays and a second portion of said image being shown on another of said displays wherein said linked image illustrates an action, a first portion of said action being shown on one of said displays and a second portion of said action being shown os another of said displays and wherein said action is an object moving from being displayed on the one of said displays to being displayed on the other display.

10. The gaming machine of claim 9 wherein said basic game includes a plurality of symbols on each of a plurality of rotatable reels.

11. The gaming machine of claim 10 wherein said start-bonus outcome includes a predetermined combination of start-bonus symbols on said reels.

12. The gaming machine of claim 9 wherein said displays are positioned parallel to each other.

13. The gaming machine of claim 12 wherein one of said displays is an upper display and another of said displays is a lower display.

14. The gaming machine of claim 9 wherein said first and second portions of said unified image interacting with each other.

15. The gaming machine of claim 14 wherein said first and second portions of said unified image showing respective first and second actions that appear to be linked to each other.

16. A method of operating a gaming machine under control of a controller comprising:

providing first and second video-type displays;

placing a wager amount on a game of chance having a plurality of outcomes;

playing said game of chance having a plurality of outcomes; and providing a unified image associated with said game of chance, a first portion of said image being shown on said first display and a second portion of said image being shown on said second display further including the step of changing said unified image based on said outcomes wherein said step of changing said image includes moving an object in said image that was shown on said first display to said second display.

17. The method of claim 16 wherein said game of chance includes a plurality of symbols on each of a plurality of rotatable reels on one of said displays.

18. The method of claim 16 wherein said game of chance includes a basic game having a start-bonus outcome and a bonus game activated in response to said start-bonus outcome, said bonus game capable of providing a plurality of bonus payouts.

19. The method of claim 16 wherein said unified image is associated with said bonus game.

20. A method of operating a gaming machine under control of a controller comprising:

providing first and second video-type displays;

placing a wager amount on a game of chance having a basic game and a bonus game, said basic game having a start-bonus outcome;

playing said basic game;

providing said bonus game in response to said start-bonus outcome, said bonus game capable of providing a plurality of bonus payouts;

providing a unified image associated with said game of chance, a first portion of said image being shown on said first display and a second portion of said image being shown on said second display further including the step of changing said unified image wherein said step of changing said image includes moving an object in said image that was shown on said first display to said second display.

21. The method of claim 20 wherein said basic game includes a plurality of symbols on each of a plurality of rotatable reels on one of said displays.

\* \* \* \* \*

UNITED STATES PATENT AND TRADEMARK OFFICE
CERTIFICATE OF CORRECTION

PATENT NO. : 6,254,481 B1
DATED : July 3, 2001
INVENTOR(S) : Jaffe

It is certified that error appears in the above-identified patent and that said Letters Patent is hereby corrected as shown below:

Column 10, claim 4,
Line 56, delete "game" and insert -- gaming --

Column 10, claim 5,
Line 62, delete "interacting" and insert -- interact --

Column 11, claim 7,
Line 4, delete "herein" and insert -- wherein --

Column 11, claim 9,
Line 13, delete "outcomes" and insert -- outcome --
Line 24, delete "os" and insert -- on --

Column 11, claim 14,
Line 40, delete "interacting" and insert -- interact --

Signed and Sealed this

Nineteenth Day of February, 2002

Attest:

*Attesting Officer*

JAMES E. ROGAN
*Director of the United States Patent and Trademark Office*